Sept. 21, 1965          E. W. FERDIG          3,206,992
ROLLER ASSEMBLY AND METHOD AND APPARATUS FOR MAKING IT
Filed Oct. 15, 1962          3 Sheets-Sheet 1
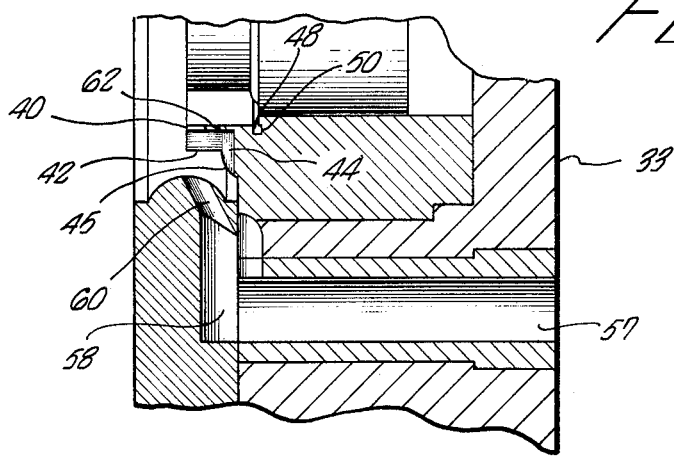
FIG. 7.
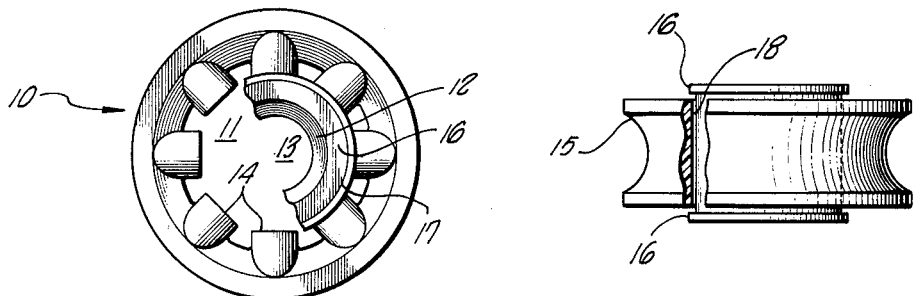
FIG. 1.
FIG. 2.
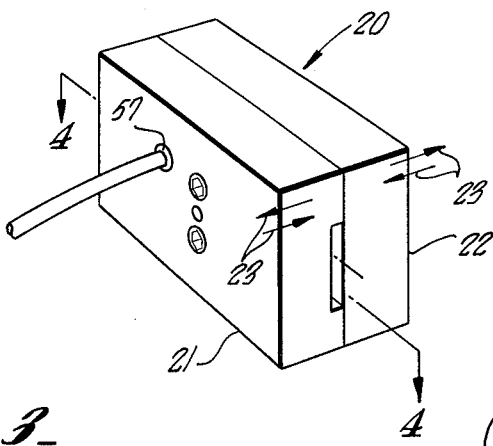
FIG. 3.
INVENTOR.
EARL W. FERDIG
BY Christie, Parker & Hale
ATTORNEYS.

Sept. 21, 1965    E. W. FERDIG    3,206,992
ROLLER ASSEMBLY AND METHOD AND APPARATUS FOR MAKING IT
Filed Oct. 15, 1962    3 Sheets-Sheet 2
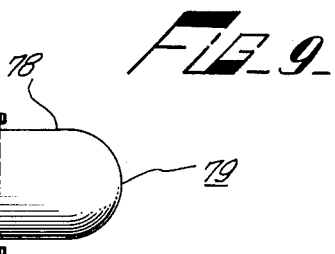
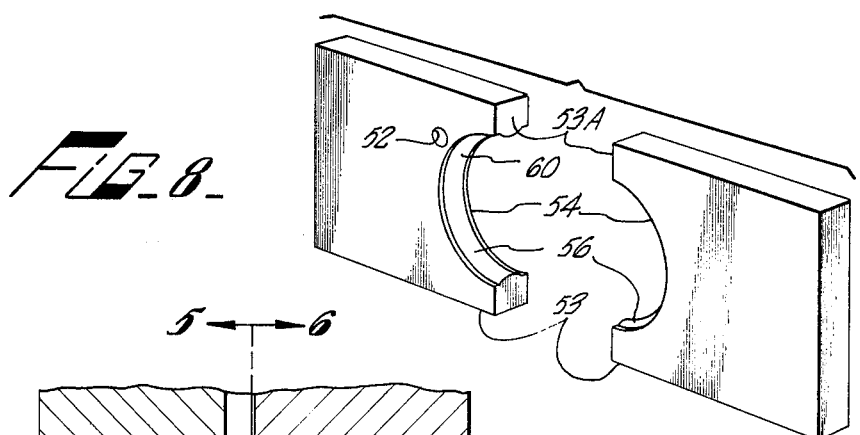
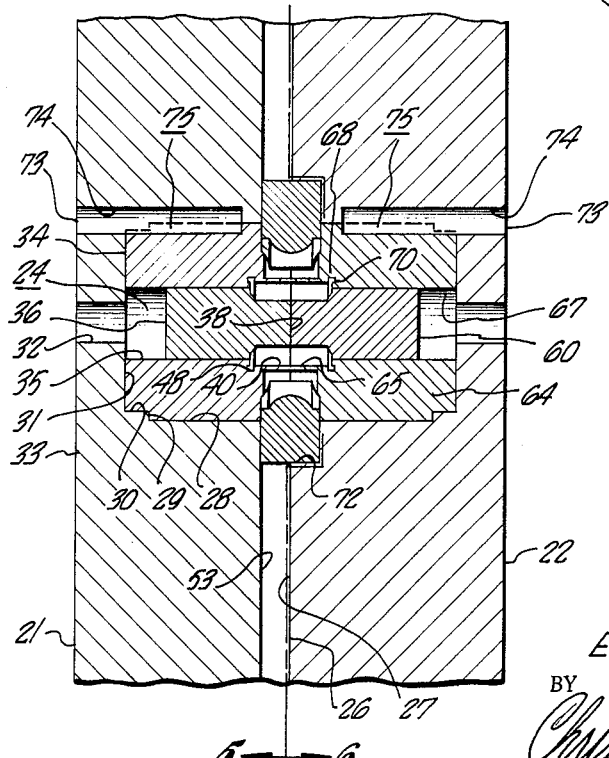
INVENTOR.
EARL W. FERDIG
BY
Christie, Parker & Hale
ATTORNEYS.

Sept. 21, 1965  E. W. FERDIG  3,206,992
ROLLER ASSEMBLY AND METHOD AND APPARATUS FOR MAKING IT
Filed Oct. 15, 1962  3 Sheets-Sheet 3

INVENTOR.
EARL W. FERDIG
BY Christie Parker & Hale
ATTORNEYS.

3,206,992
ROLLER ASSEMBLY AND METHOD AND APPARATUS FOR MAKING IT
Earl W. Ferdig, Burbank, Calif., assignor to
George F. McMurray, Glendale, Calif.
Filed Oct. 15, 1962, Ser. No. 231,328
7 Claims. (Cl. 74—230.3)

This invention relates to roller assemblies and method and apparatus for making them.

This invention has many different uses, such as in wheels, bearings, and the like, but is specifically described with reference to its use as a pulley for drapery pull cords.

There is a large demand for an inexpensive roller which can be used as a wheel, bearing, pulley, and the like. In the past, such rollers have been made by separately molding plastic rollers and shafts, and thereafter assembling the molded parts. The disadvantage of such rollers and the procedures for making them is that the various parts must be cast and handled separately, and the assembling step is time-consuming and expensive.

This invention provides a plastic roller assembly which is cast in a simple mold and ejected from the mold ready for immediate use, i.e., the roller is cast around the shaft to be rotatable on it, and yet be locked against longitudinal movement to prevent the roller from sliding off the shaft.

Briefly, the invention includes a plastic roller having an axial opening through it. A plastic shaft is disposed through the opening in the roller, and a pair of outwardly extending flanges are formed integrally on the shaft on opposite sides of the roller. The effective outer diameter of each flange is greater than the effective diameter of the axial opening through the roller to prevent the roller from slipping off the shaft. Preferably, an annular longitudinally extending lip is formed on the periphery of each flange to increase its rigidity and strength in resisting longitudinal movement of the roller along the shaft.

In one presently preferred embodiment of the invention, the shaft includes a longitudinal opening through it to facilitate mounting of the roller in various installations, e.g., as pulleys for drapery pull cords. In the preferred form of the invention, the roller includes a plurality of inwardly extending longitudinal projections or spokes radially spaced around the axial opening through it. The inner portions of the ribs define the effective diameter of the axial opening. When the roller is to be used as a pulley, its outer periphery is concave to receive and restrain a cord, or the like.

To form the outwardly extending flanges on the shaft which limit the longitudinal movement of the roller on the shaft, the mold for casting the roller of this invention requires undercut cavities which ordinarily would involve an expensive mold of many different parts to facilitate removal of the cast product. This invention provides a unique method for removing the cast roller assembly from a relatively simple mold, even though the flanges extend transversely to the direction of removal from the mold.

Briefly, the method includes pouring molten plastic into a mold to form a roller having an axial opening through it, and to form a shaft disposed within the opening. The shaft has outwardly extending flanges on opposite sides of the roller opening, and the flanges have a greater effective diameter than that of the axial opening. The plastic in the mold is cooled to a state being solid and having some degree of elasticity. While the plastic is still hot and elastic, the shaft and roller are stripped from the mold so that the flanges can be resiliently deformed to release from the mold and then return to their original cast positions. Thereafter, the plastic cools to a further hardened state so that the roller cannot be removed from the shaft without rupturing the plastic material.

The mold for casting the roller assembly includes a body which defines a hole. An annular inner wall is disposed within the hole to be in contact at its ends with the body and to be disposed around the central portion of the hole to form a longitudinal shaft cavity. The surface of the hole has a first undercut recess located beyond one end of the wall. The first recess communicates with the hole and extends outwardly past the inner wall. The surface of the hole also has a second undercut recess located beyond the other end of the wall. The second recess communicates with the hole and extends under and outwardly past the inner wall to form the second flange cavity. The first and second recesses form first and second flange cavities, respectively. An outer annular wall is disposed around the space beyond the inner wall to define an annular roller cavity between the two walls.

In the preferred form of the mold, each flange cavity is annular and is joined at its respective periphery by a separate longitudinally extending annular recess for forming the reinforcing lip on each flange. Preferably, the annular inner wall is relatively thin with a plurality of radially spaced and outwardly extending longitudinal projections. The wall is as thin as is practicable, because the thickness of the wall defines the play between the shaft and the roller. The longitudinal projections on the outer portion of the inner wall provides ribs to strengthen the inner annular wall without increasing the play between the shaft and roller in the final product, because the spokes of the roller are molded between the ribs on the inner wall. Preferably, the outer wall of the mold is convex, so that the periphery of the roller is concave. The mold also includes a filling channel through the body to discharge into the hole and, preferably, the inner wall includes an opening through it to provide a flow passage of plastic from the outer to the inner portion of the mold.

Conveniently, the mold is formed from a pair of blocks having opposed surfaces. Longitudinal openings in each block open out of the opposing surfaces to form the mold hole when the surfaces are held together. Movable split plates with a circular opening having a convex wall are used to form the outer wall. Movable pins are disposed in each block to extend into the recesses which form the mold hole to define a longitudinal opening through the shaft, and provide means for ejecting the cast assembly from the mold.

These and other aspects of the invention will be more fully understood from the following detailed description and the accompanying drawings in which:

FIG. 1 is a plan view, partly broken away, of the presently preferred embodiment of the invention;

FIG. 2 is an elevation, partly broken away, of the roller assembly shown in FIG. 1;

FIG. 3 is a perspective view of the mold used to form the roller assembly shown in FIGS. 1 and 2;

FIG. 4 is a view taken on line 4—4 of FIG. 3;

FIG. 7 is a view taken on line 7—7 of FIG. 5;

FIG. 8 is an exploded perspective view of the two plates which form the outer annular wall in the mold; and FIG. 9 is an elevation of an alternate embodiment of the invention in which the periphery of the roller is convex instead of concave.

Figure 5:
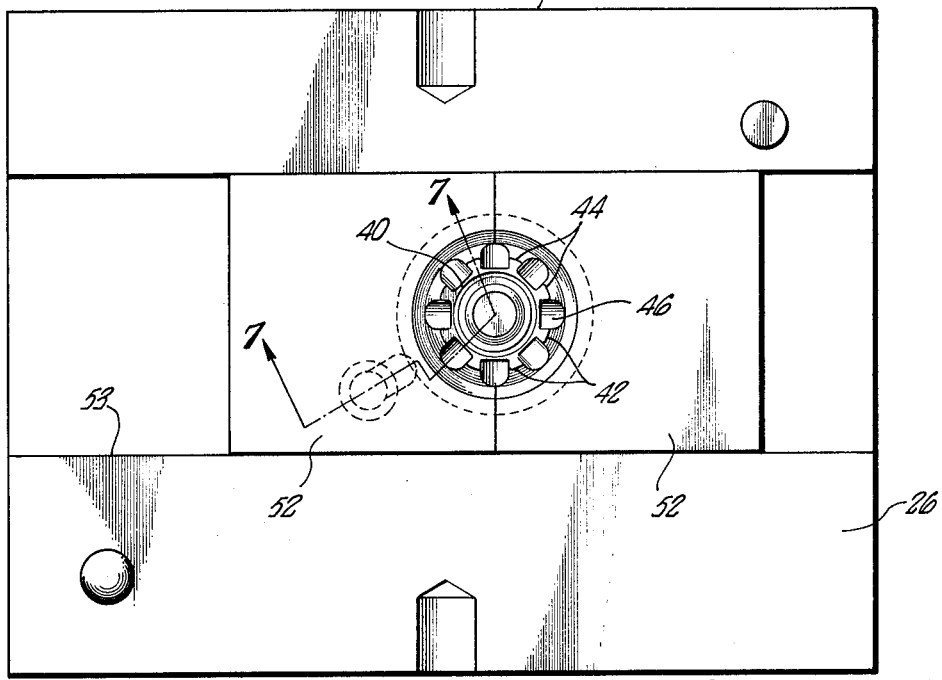
FIG. 5 is a view taken on staggered line 5—5 of FIG. 4.
Figure 6:
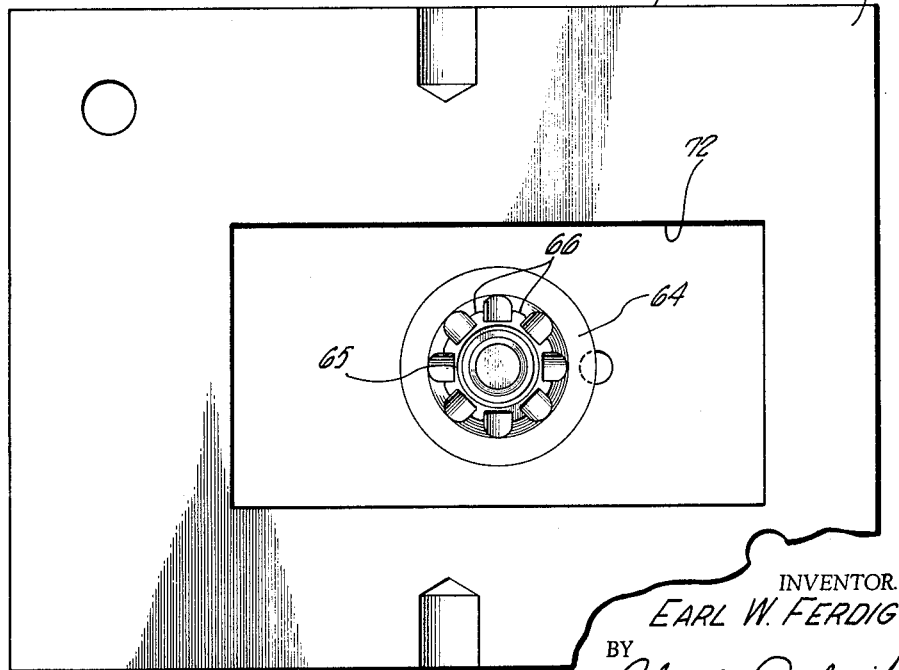
FIG. 6 is a view taken on staggered line 6—6 of FIG. 4.

Referring to FIGS. 1 and 2, an annular roller 10 has a longitudinal axial opening 11 in which is disposed an annular shaft 12 having a longitudinal central bore 13 through it. Preferably, both the shaft and the axis are made of plastic which is easily molded under heat and pressure. Nylon and phenolic condensation products are especially suitable because as they cool from a molten to a rigid state, they go through a phase in which they are solid and yet relatively elasitc. This feature is particularly important in releasing the roller-shaft assembly of this invention from a simple mold, as is explained in detail below.

The inner periphrey of the roller includes a plurality of radially spaced and longitudinally extending projections or spokes 14, the inner faces of which define the effective diameter of the longitudinal opening 11 through the roller. The spokes are formed integrally with the roller in a molding operation subsequently described. The outer periphery of the roller is concave to form an annular groove 15 which is particularly useful when the roller assembly is used as a pulley, or the like.

A separate outwardly extending flange 16 is formed at each end of the shaft. The effective outside diameter of each flange is substantially greater (as shown in FIG. 2) than the effective internal diameter of the roller. Thus, the roller cannot slide longitudinally off the shaft because the inwardly extending spokes would engage the inside surfaces of the flanges. As best shown in FIG. 1, each flange includes an integral annular lip 17 which extends longitudinally away from the roller and adds strength and rigidity to the periphery of each flange.

The bore 13 through the shaft facilitates mounting the assembly by conventional bolts, rivets, and the like. As the roller is subjected to a load, say a drapery pull cord (not shown) the roller slides around the shaft, the inner ends of the spokes acting as bearing surfaces against the outside of the shaft. As shown in FIG. 2, the clearance between the shaft and the spokes is less than half the distance that the shaft flange overlaps the spokes, so that even when the roller is loaded transversely to force the spokes on one side against the shaft, the flanges still overlap the spokes around the entire periphery of the flanges to prevent "cocking" or jamming of the roller.

FIGS. 3–8 shows a mold 20 for forming the roller assembly shown in FIGS. 1 and 2. The mold includes first and second rectangular blocks 21 and 22, respectively, adapted to be moved toward and away from each other in the directions shown by arrows 23 in FIG. 3. The movement of the block is preferably achieved by conventional automatic means (not shown).

A stepped bore 24 extends through the first block 21 in a direction normal to an interior flat surface 26, which faces toward a flat surface 27 on the second block 22. The stepped bore 24 includes a relatively large section 28 opening out of the surface 26. A first inwardly extending shoulder 29 is formed between section 28 and a section 30 of the stepped bore 24. A second inwardly extending shoulder 31 is formed between section 30 and a section 32 of the stepped bore 24. The section 32 opens out of a surface 33 opposite from interior surface 26 of the first block. An annular first mold insert 34 makes a close fit in the stepped bore 24 and bottoms against shoulders 29 and 31. A longitudinal bore 35 extends through the first mold insert, and is slightly larger than and collinear with the reduced section 32 of the stepped bore 24. A first ejection pin 36 makes a close sliding fit in the bore 35 of the first mold insert. The end of the first ejection pin adjacent the second block is of reduced external diameter and has a flat face 38 which normally is in the plane of the contiguous surfaces 26 and 27 when the first and second blocks are fitted together as shown in FIG. 4. As shown best in FIG. 7, a thin annular wall 40 is formed integrally with the end of the first mold insert adjacent the second block. The remote end of the first annular inner wall is flush with the normal position of the flat face 38 of the first injection pin. A plurality of radially spaced and longitudinally extending ribs 42 are formed integrally around the outside surface of the first annular inner wall. The end of each rib adjacent the first mold insert includes an outwardly extending foot 44 with an outer convex surface portion 45 shaped so that a concave surface portion 46 is formed between adjacent feet 44. The ribs and feet of the mold form the spokes and spaces between their adjacent ends, as shown in FIG. 1.

A first annular undercut flange recess 48 (FIG. 7) is formed in the first mold insert to open into the longitudinal bore 35 extending through the insert. A first annular lip recess 50 communicates with the outer periphery of the first flange recess and extends longitudinally away from the thin annular wall. The first flange recess and its adjoining longitudinal recess form one flange and lip on the shaft shown in FIGS. 1 and 2. Moreover, the recesses 48 and 50 are located outwardly of the outside diameter of the thin wall 40, the thickness of which determines the annular space 18 between the shaft and effective internal diameter of the roller. Thus, the flange and its associated lip formed by recesses 48 and 50 are outwardly of the inner limits of the spokes 14 shown in FIGS. 1 and 2. It is this feature which prevents the roller from slipping longitudinally off the shaft.

As shown in FIG. 5, a pair of plates 52 are disposed to be movable toward and away from each other in a guide groove 53 formed in the surface 26 of the first block. In the position shown in FIG. 5, the inner edges 53A of plates 52 abut along a line passing through the center of the stepped bore 24 through the first block. Referring to FIG. 8, the inner edges of each plate include a semi-circular recess 54 which form an outer annular wall 56 around the inner annular wall when the plates are pushed together as shown in FIG. 5. Preferably, the annular wall is convex inwardly to form the annular groove 15 in the roller as shown in FIG. 2.

Liquid plastic is injected into the mold through a filling opening 57 which extends from the outside surface 33 to open into the bottom of the guide groove 53 in the first block. With the plates in the position shown in FIG. 5, and particularly in FIG. 7, a passage 58 in the bottom of one of the plates 52 overlies the filling opening 57. The passage 58 opens through an inclined channel 60 through the outer annular wall and into the mold hole. A flow opening 62 in the thin annular wall on the first mold insert permits palstic to flow into the space within the inner annular wall.

The second block 22 is virtually a mirror image of the first block, and therefore is not described in detail. It includes a second mold insert 64 with a thin inner annular wall 65 that abuts the inner annular wall 40. A second ejection pin 66 makes a close sliding fit within a longitudinal bore 67 of the second mold insert. The second thin annular wall 65 does not include a flow opening because the flow opening in the first annular inner wall is adequate. A second annular flange recess 68 is formed in the second mold insert and opens into a longitudinally extending lip recess 70 to form a flange and lip identical with those formed by recesses 48 and 50 in the first mold insert. A rectangular recess 72 in the insert surface 27 of the second block is formed around the second mold insert to hold the plates 52 firmly in the position shown in FIGS. 4, 5, and 7 during the molding operation. The second inner annular wall also includes radially spaced and longitudinally extending ribs 66 which are identical with those formed on the first annular inner wall. The two mold inserts are each locked in proper rotational orientation with respect to each other by keys 73 in collinear bores 74 in each of the blocks. Each key fits in a respective keyway 75 in each mold insert.

To cast the assembly shown in FIGS. 1 and 2, the mold is closed to the position shown in FIGS. 3, 4, and 7. Fluid plastic, say hot nylon, is injected through a tube 76 into filling opening 57 of the mold. The fluid plastic flows through passage 58, channel 60, and into the annular space between the inner and outer annular walls formed by the plates and the two mold inserts. Plastic also flows through the flow opening 62 in the inner annular wall on the first mold insert and fills the annular space between the inner annular wall and the injection pins.

After the mold is full of plastic, injection is stopped and the mold is allowed to cool until the plastic reaches a fluid but elastic state. Then, and before the plastic takes its final set of maximum rigidity, the first and second blocks are pulled apart in the direction of the arrows 23 in FIG. 3. As the plates are pulled apart, ejection pin 66 in the second mold insert is pushed to the left (as viewed in FIG. 4) by conventional automatic means (not shown) to eject the flange and lip from recesses 68 and 70 in the second mold insert. The plastic is sufficiently elastic to permit the required deformation, and yet returns immediately to the original shape cast in the mold. The plates remain in the position shown in FIG. 5, but are now free to slide apart in the guide groove 53. The plates are pulled apart to release the periphery of the roller, and shear the plastic in the inclined channel 60 from the roller. Ejection pin 56 in the first block is pushed to the right (as viewed in FIG. 4) to eject the shaft flange and lip formed in the first mold insert. The plastic is still of sufficient elasticity that the flanges and lips on the shaft can be ejected from the mold even though considerable deformation is required. The plastic has adequate "memory" to return to the original cast position once the part is free of the mold so that the assembly has the exact shape shown in FIGS. 1 and 2. The thin plastic web in flow opening in the inner annular wall is sheared during this operation and the roller is free to rotate on the shaft.

Thus, a roller can be permanently cast on a shaft without requiring any assembling step, and without requiring special molds which require a plurality of complicated and expensive parts to release undercut portions of molded articles.

Of course the roller can assume a variety of shapes, and need not have a concave periphery. For example, as shown in FIG. 9, a roller 78 has a convex periphery 79 when the assembly is to be used as a wheel, or the like.

I claim:
1. A roller assembly comprising:
   (a) a roller having an axial opening therethrough,
   (b) a shaft disposed in the opening in the roller and having a pair of outwardly extending flanges formed integrally with the shaft on opposite sides of the roller,
   (c) each of the flanges having an effective outer diameter greater than the effective diameter of the axial opening through the roller to prevent the roller from slipping off of the shaft,
   (d) the roller and shaft being formed in an assembled position of the same plastic material by injecting the plastic into a mold having a common annular wall for providing an annular space between the shaft and roller.
2. A roller assembly comprising:
   (a) a roller having an axial opening through it,
   (b) a shaft disposed in the opening in the roller and having a pair of outwardly extending integral flanges on opposite sides of the roller,
   (c) each of the flanges having an effective outer diameter greater than the effective diameter of the axial opening in the roller adjacent the respective flange,
   (d) the roller and shaft being formed of the same plastic by injecting the plastic into a mold having a common annular wall for separating the shaft and roller,
   (e) the roller and shaft being stripped from the mold while the plastic is solid and sufficiently elastic to cause the flanges of the shaft to flex inwardly through the inner surface of the common annular wall of the mold,
   (f) the flanges of the shaft having sufficient rigidity after the completion of the molding operation to prevent the roller from being removed from the shaft without rupturing the plastic.
3. The combination as defined in claim 2 wherein the roller defines a concave outer surface to form a pulley.
4. The combination as defined in claim 2 wherein the thickness of each of the flanges increases at the periphery thereof.
5. A roller assembly comprising:
   (a) a roller having an axial opening through it,
   (b) a shaft disposed in the opening in the roller,
   (c) the shaft having a smooth external surface and a pair of outwardly extending integral flanges on opposite sides of the roller,
   (d) the roller defining a plurality of radial integral projections extending into the axial opening to make a sliding fit around the smooth external surface of the shaft, the inner portions of the projections defining the effective diameter of the opening through the roller,
   (e) the flanges having an effective outer diameter greater than the effective diameter of the axial opening through the roller to prevent the roller from slipping off of the shaft,
   (f) the roller and shaft being formed in an assembled position of the same plastic material by injecting the plastic into a mold having a common annular wall for providing an annular space between the shaft and roller,
   (g) the flanges of the shaft and the inward projections of the roller having sufficient rigidity after completion of the molding operation to prevent the roller being removed from the shaft without rupturing the plastic.
6. The combination as defined in claim 5 wherein the radial projections of the roller are uniformly circumferentially spaced.
7. The combination as defined in claim 5 wherein each of the annular flanges includes a longitudinally extending lip on the periphery of each flange.

References Cited by the Examiner

UNITED STATES PATENTS

| | | | |
|---|---|---|---|
| 312,733 | 2/85 | Koch | 74—230.7 X |
| 599,122 | 2/98 | Donohue | 254—192 X |
| 1,576,924 | 3/26 | Malloy | 74—230.7 X |
| 1,620,515 | 3/27 | Buchheit | 248—266 |
| 1,637,763 | 8/27 | Clegg | 248—266 |
| 2,238,435 | 4/41 | Perry | 287—52 |
| 2,285,791 | 6/42 | Auslander | 254—192 |
| 2,497,224 | 2/50 | Laure | 308—15 |
| 2,724,867 | 11/55 | Smith. | |
| 2,924,431 | 2/60 | Chadbourne | 74—230.01 X |
| 3,051,607 | 8/62 | Werth | 264—242 |
| 3,089,198 | 5/63 | Eirhart | 264—242 |
| 3,108,328 | 10/63 | Kelleher | 18—36 |
| 3,108,329 | 10/63 | Chapman | 18—36 |

DON A. WAITE, *Primary Examiner.*

ALEXANDER H. BRODMERKEL, *Examiner.*